United States Patent
Russell

(10) Patent No.: US 9,531,840 B2
(45) Date of Patent: *Dec. 27, 2016

(54) METHOD AND SYSTEM FOR CHANGING EXECUTION ENVIRONMENTS DURING APPLICATION EXECUTION

(71) Applicant: Oracle International Corporation, Redwood City, CA (US)

(72) Inventor: Kenneth B. Russell, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,630

(22) Filed: Apr. 14, 2014

(65) Prior Publication Data

US 2014/0229532 A1  Aug. 14, 2014

Related U.S. Application Data

(63) Continuation of application No. 12/248,349, filed on Oct. 9, 2008, now Pat. No. 8,789,068.

(Continued)

(51) Int. Cl.
*G06F 9/46* (2006.01)
*H04L 29/06* (2006.01)
(Continued)

(52) U.S. Cl.
CPC ............. *H04L 67/42* (2013.01); *G06F 9/4443* (2013.01); *G06F 9/4812* (2013.01)

(58) Field of Classification Search
None
See application file for complete search history.

(56) References Cited

U.S. PATENT DOCUMENTS 5,903,728 A * 5/1999 Semenzato ............. G06F 9/547
  709/217
6,125,402 A   9/2000 Nagarajayya
(Continued)

FOREIGN PATENT DOCUMENTS

| EP | 0893758 A2 | 2/2004 |
| EP | 0893758 A3 | 2/2004 |
| EP | 1391814 A1 | 2/2004 |

OTHER PUBLICATIONS

Oracle Technology Network, Java Runtime Environment Version Selection, New Java Plug-In Release Notes, Java SE 6u10 Update Release Notes, found at http://www.oracle.com/technetwork/java/javase/index-141751.html Apr. 5, 2016.

(Continued)

*Primary Examiner* — Dong Kim
(74) *Attorney, Agent, or Firm* — Park, Vaughan, Fleming & Dowler LLP

(57) ABSTRACT

Some embodiments of the present invention provide a system that executes an application. During operation, the system starts the application using a web browser. Next, the system receives an execution environment change notification from a user of the application, and in response to the notification transitions the application to a second execution environment without interrupting the execution of the application.

24 Claims, 5 Drawing Sheets

Related U.S. Application Data

(60) Provisional application No. 60/978,871, filed on Oct. 10, 2007.

(51) Int. Cl.
　　*G06F 9/44*　　(2006.01)
　　*G06F 9/48*　　(2006.01)

(56) References Cited

U.S. PATENT DOCUMENTS

| | | |
|---|---|---|
| 6,401,134 B1 * | 6/2002 | Razavi et al. ............... 719/310 |
| 2002/0120673 A1 * | 8/2002 | Tolson et al. ............... 709/202 |
| 2004/0028212 A1 | 2/2004 | Lok |
| 2004/0212635 A1 * | 10/2004 | Mussini ..................... 345/700 |
| 2006/0036969 A1 * | 2/2006 | Guido et al. ................ 715/804 |
| 2008/0098296 A1 | 4/2008 | Brichford et al. |
| 2008/0271127 A1 * | 10/2008 | Naibo et al. .................... 726/6 |

OTHER PUBLICATIONS

Friesen, Jeff, JavaWorld News: Plug into Java with Java Plug-in, Learn how Sun's software tool solves the lag time between Java releases and new browser versions, Jun. 1, 1999. Located at http://www.oracle.com/technetwork/java/javase/index-141751.html.

* cited by examiner

METHOD AND SYSTEM FOR CHANGING EXECUTION ENVIRONMENTS DURING APPLICATION EXECUTION

RELATED APPLICATIONS

This application is a continuation of, and hereby claims priority under 35 U.S.C. §120 to a "parent application," pending U.S. patent application Ser. No. 12/248,349, entitled "Method and System for Changing Execution Environments during Application Execution," by inventor Kenneth B. Russell, filed on 9 Oct. 2008. This parent application claims priority under 35 U.S.C. §119 to U.S. Provisional Patent Application No. 60/978,871, filed on 10 Oct. 2007, entitled "Dragging Java Applets to the Desktop," by inventors Kenneth B. Russell and Hans E. Muller.

BACKGROUND

Field

The present invention relates to systems that support execution of applications. More specifically, the present invention relates to a method and system for changing execution environments during the execution of applications.

Related Art

An applet is a software component that can execute in the context of another program, such as a web browser. Examples of applets include Java (Java™ is a registered trademark of Sun Microsystems, Inc.) applets and Flash (Flash™ is a registered trademark of Adobe Systems Inc.) movies. In addition, applets often perform specific functions beyond the default capabilities of their execution environments (e.g., web browsers, desktop environments). For example, applets may provide features such as games, math or physics simulations, calculators, timers, calendars, and/or weather reports.

An applet is often run within a container provided by a host program, a plugin, a virtual machine, and/or a compatible application. The applet may also receive services through the container from the container provider. Furthermore, termination of the container provider typically results in termination of the applet. For example, an applet running through a web browser may stop executing when the web browser is closed. Consequently, applet usage may be limited by the applet's inability to run independently of the original execution environment.

SUMMARY

Some embodiments of the present invention provide a system that executes an application. During operation, the system starts the application using a web browser. Next, the system receives an execution environment change notification from a user of the application, and in response to the notification transitions the application to a second execution environment without interrupting the execution of the application.

In some embodiments, the application and the web browser are executed in separate operating system processes.

In some embodiments, the second execution environment can be a local desktop environment, a virtual desktop environment, a remote desktop environment or a cooperating application.

In some embodiments, a message passing service implementation is used to provide services to the application from the web browser.

In some embodiments, the application is transitioned to the second execution environment by replacing the message passing service implementation with a standalone service implementation, wherein the standalone service implementation ignores messages between the application and the web browser.

In some embodiments, the application is transitioned to the second execution environment by replacing the message passing service implementation with a new message passing service implementation, wherein the new message passing service implementation facilitates communication between the application and the cooperating application.

In some embodiments, the application is a Java applet.

In some embodiments, the execution environment change notification involves a drag-and-drop action or a cut-and-paste action which moves a visual representation of the application from a visual representation of the web browser to a visual representation of the second execution environment.

DETAILED DESCRIPTION

Figure 1A:
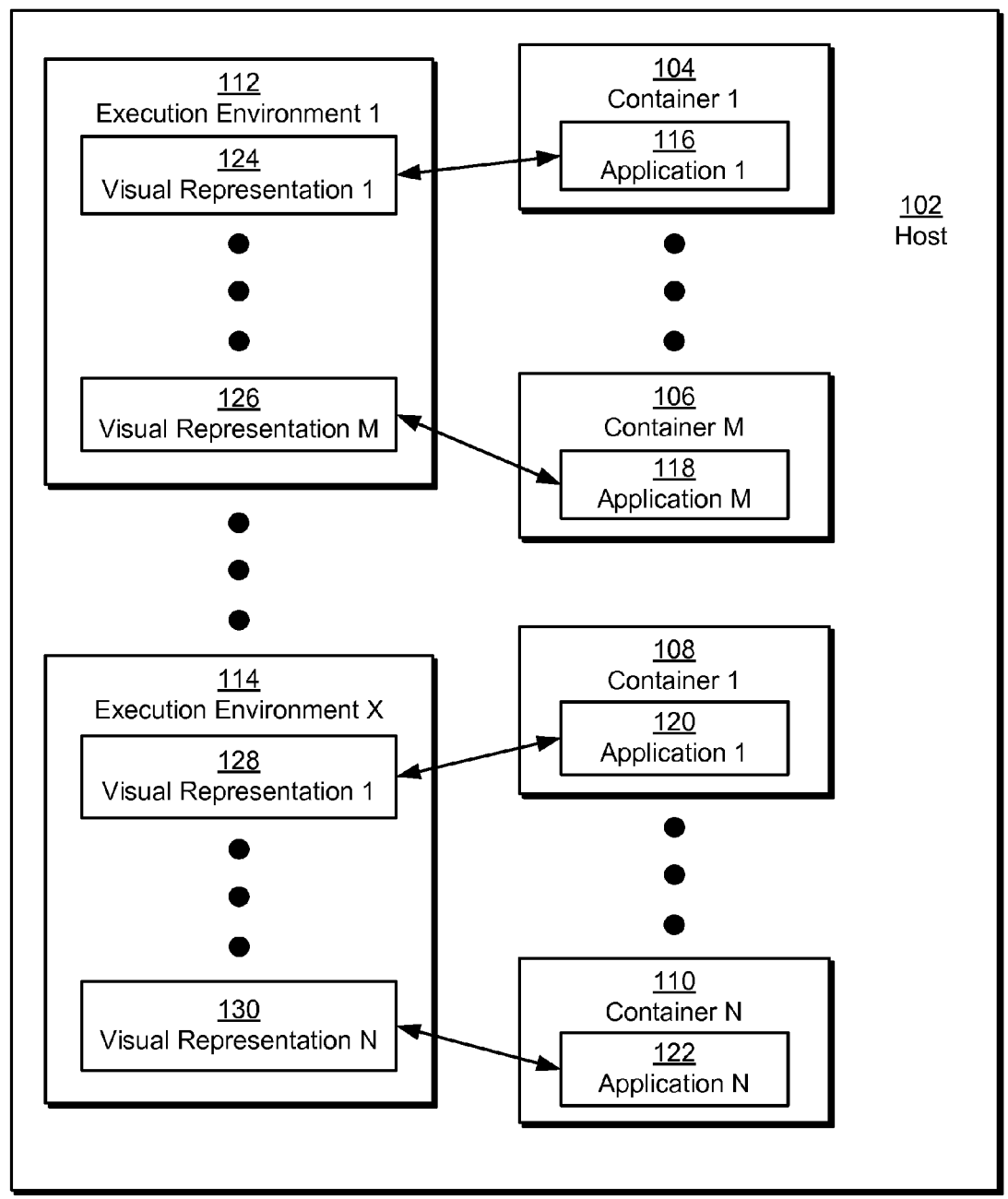
FIG. 1A shows a schematic of a system in accordance with an embodiment of the present invention.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

In general, embodiments of the invention provide a method and system for executing applications. Applications may include web-based applications, such as applets. Specifically, embodiments of the invention provide a method and apparatus for changing execution environments during application execution. In one or more embodiments of the invention, an application may be started in a first execution environment, such as a web browser. The application may then be transitioned to a second execution environment, such as a cooperating application or a desktop environment (e.g., local desktop environment, virtual desktop environment, remote desktop environment, etc.), without interrupting the execution of the application.

For example, the application may be loaded within a webpage to provide communication (e.g., instant messaging, email, phone, etc.) features between users of the application. A user may begin using the application within a web browser and decide to continue using the application after completing his/her browsing session with the web browser. As a result, the user may drag, cut-and-paste, or otherwise move the applet from the webpage to the desktop of the computer from which the webpage is loaded. Upon transitioning to the desktop, the applet may be disconnected from the web browser and/or integrated into the desktop environment. Furthermore, the execution of the applet on the desktop may continue after the execution of the web browser is terminated. In other words, the executing application may transition from a web application to a desktop application without interrupting the application's execution.

FIG. 1A shows a schematic of a system in accordance with an embodiment of the present invention. Specifically, FIG. 1A shows a system for executing applications through multiple execution environments in accordance with an embodiment of the present invention. The system includes a host 102 with multiple execution environments (e.g., execution environment 1 112, execution environment x 114). Applications (e.g., application 1 116, application m 118, application 1 120, application n 122) on host 102 are run within containers (e.g., container 1 104, container m 106, container 1 108, container n 110) associated with the execution environments. In addition, visual representations (e.g., visual representation 1 124, visual representation m 126, visual representation 1 128, visual representation n 130) of applications within a particular container are displayed within the corresponding execution environment.

Host 102 may correspond to an electronic device that provides one or more services or functions to a user. For example, host 102 may operate as a mobile phone, personal computer, workstation, global positioning system (GPS) receiver, portable media player, personal digital assistant (PDA), and/or graphing calculator. In addition, host 102 may include an operating system that coordinates the use of hardware and software resources on host 102, as well as one or more applications (e.g., application 1 116, application m 118, application 1 120, application n 122) that perform specialized tasks for the user. For example, host 102 may include applications such as an email client, an address book, a document editor, a tax preparation application, a web browser, and/or a media player. To perform tasks for the user, the applications may obtain the use of hardware resources (e.g., processor, memory, I/O components, wireless transmitter, etc.) on host 102 from the operating system, as well as interact with the user through a hardware and/or software framework provided by the operating system.

To enable interaction with the user, host 102 may include one or more hardware input/output (I/O) components, such as a pointing device and a display screen. Each hardware I/O component may additionally be associated with a software driver (not shown) that allows the operating system and/or applications on host 102 to access and use the hardware I/O components.

Execution environments (e.g., execution environment 1 112, execution environment x 114) may correspond to software-based environments that enable user interaction with the applications. For example, a user may interact with a spell checking plugin through a word processing application. Similarly, applications may be initialized and executed from a desktop environment. Execution environments may also refer to various software components on host 102. For example, execution environments may include application software (e.g., word processors, spreadsheets, media players, web browsers, etc.), through which plugins, applets, and widgets may run.

Applications may also be executed through system-based execution environments such as operating systems, file systems, and/or utilities. Moreover, execution environments may further be nested. For example, a plugin may execute through a larger application, which may execute through an operating system desktop.

In one or more embodiments of the invention, applications on host 102 are started, accessed, and/or terminated through a corresponding execution environment. For example, a word-processing application may be started by double-clicking an icon on a desktop environment and/or windowing system. Once an application is started, the application is run from a container associated with the execution environment. Examples of containers may include applet containers for applets (e.g., Java (Java™ is a registered trademark of Sun Microsystems, Inc.) applets), the Flash (Flash™ is a registered trademark of Adobe Systems Inc.) Player for Flash movies, Enterprise JavaBeans (EJBs) (Enterprise JavaBeans™ is a registered trademark of Sun Microsystems, Inc.) containers for EJBs, and/or plugin containers for executing plugins.

In particular, each container may manage the startup and termination of the corresponding application and further provide services to the application that enable the application to perform tasks for the user. For example, application 116 may request HyperText Markup Language (HTML) documents via a network connection (not shown) provided by host 102. Container 104 may retrieve the documents using the network connection and provide the documents to application 116. Application 116 may then display the documents to the user and/or provide various features to the user using data obtained from the documents.

Those skilled in the art will appreciate that execution environments may be associated with multiple containers and/or applications running within containers. Furthermore, each container may be configured to provide a different set of services to the corresponding application. For example, a word-processing application may include several containers for executing various word processing plugins. Each container may be designed to interact with and provide services to the plugin within based on desired functionality, security, and/or other criteria.

In one or more embodiments of the invention, certain applications are configured to execute through multiple execution environments. More specifically, a widget running within a web browser may also be configured to run on a desktop or within a cooperating application. To change execution environments, the widget may be required to temporarily stop execution and/or undergo additional configuration changes. For example, a web-based widget may separately be installed on host 102 for local execution on host 102. However, host 102 may include a framework for changing an application's execution environment without interrupting execution of the application, as described below with respect to FIG. 1B.

Figure 1B:
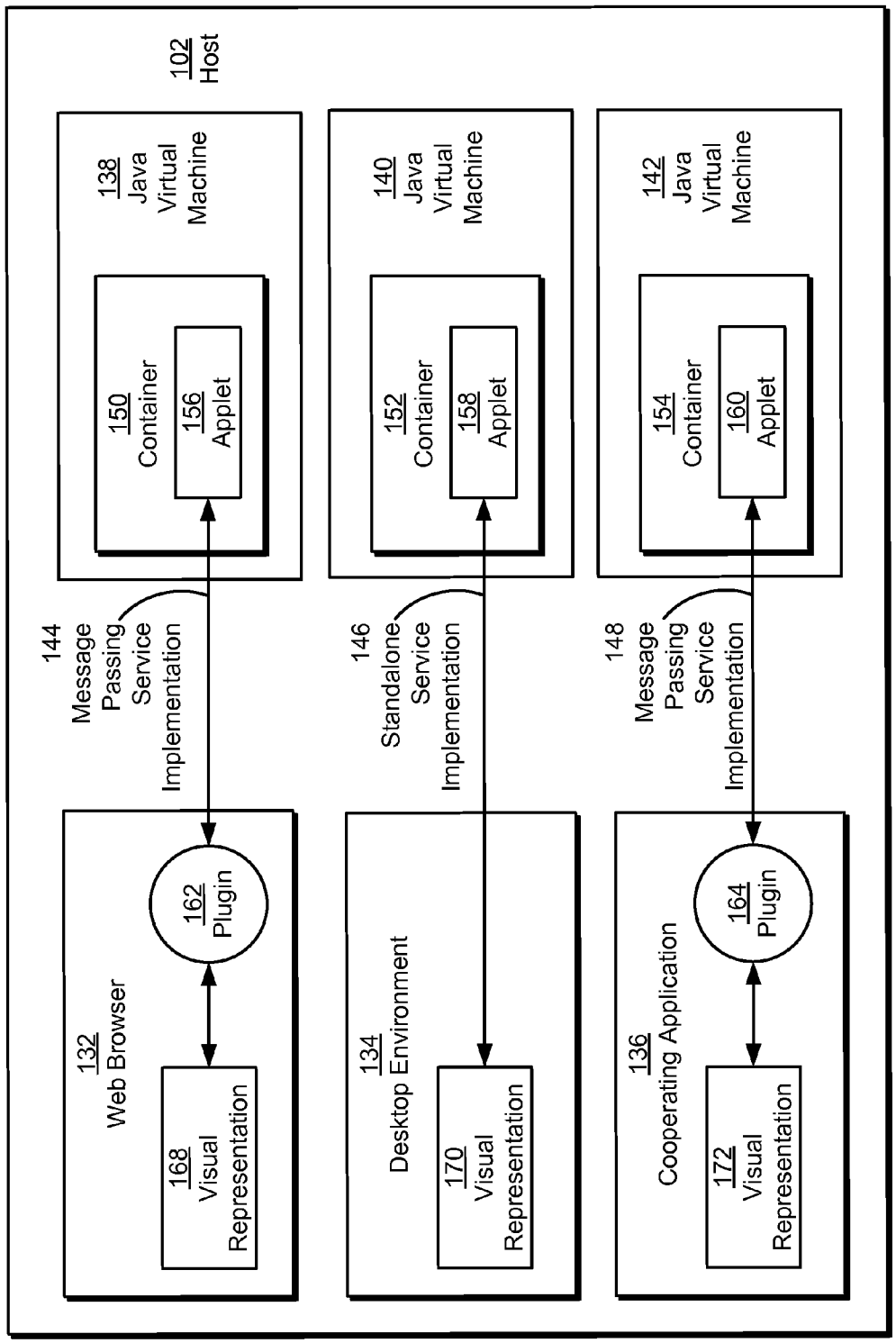
FIG. 1B shows a schematic of a system in accordance with an embodiment of the present invention.

FIG. 1B shows a schematic of a system in accordance with an embodiment of the present invention. Specifically, FIG. 1B shows a Java framework for changing application execution environments without interrupting the execution of the applications. As shown in FIG. 1B, the framework is implemented using one or more Java Virtual Machines (JVMs) 138-142 and includes a web browser 132, a desktop environment 134, and a cooperating application 136 through which applications may execute. The framework also includes a number of service implementations (e.g., message passing service implementation 144, standalone service implementation 146, message passing service implementation 148) that provide services to the applications based on the execution environments (e.g., web browser 132, desktop environment 134, cooperating application 136) in which the applications run.

In one or more embodiments of the invention, applications on host 102 correspond to web applications. In other words, applications on host 102 may correspond to applets 156-160 (e.g., Java applets) that are started in and/or run through web browser 132. As a result, visual representations 168-172 of applets within host 102 may initially be embedded and displayed within web browser 132. The user may further interact with the applets by providing input through web browser 132. For example, applet 156 may be started by navigating web browser 132 to a webpage in which applet 156 is embedded. Upon loading the page, applet 156 is executed within a container 150 provided by JVM 138, and a visual representation 168 of the applet is displayed in web browser 132.

To initiate applet execution, web browser 132 may invoke a plugin 162 (e.g., a Java plugin). In particular, plugin 162 may spawn an instance of JVM 138 and execute the applet within a container 150 that is provided by JVM 138. Plugin 162 may further facilitate integration of the applet within web browser 132 by establishing a connection between JVM 138 and web browser 132. In addition, plugin 162 and/or JVM 138 may display visual representation 168 within web browser 132 through communications with the operating system installed on host 102. For example, visual representation 168 may be displayed within the visual representation of web browser 132 using techniques such as inheritance of window handles and/or protocols such as XEmbed. Those skilled in the art will appreciate that JVM 138 may be spawned using a variety of methods, including, for example, platform-dependent system calls and platform-independent Java programming language application programming interfaces (APIs).

In one or more embodiments of the invention, an instance of plugin 162 is created for each applet encountered by web browser 132. Alternatively, initialization of all applets encountered by web browser 132 may be handled by a single instance of plugin 162 using multithreading and/or other techniques.

Those skilled in the art will appreciate that applets (e.g., applet 156) associated with web browser 132 may be executed using a combination of plugin 162 and/or JVM instances (e.g., JVM 138). For example, each applet may have a one-to-one mapping with each instance of plugin 162 and/or the corresponding JVM instance. On the other hand, applets may be mapped to instances of plugin 162 and/or JVM 138 based on other criteria, such as plugin and/or JVM versions. Applets may also swap JVM 138 and/or plugin 162 instances due to events such as a reboot of host 102 and/or web browser 132. For example, each applet may begin running on a separate JVM instance and plugin instance. However, after a reboot of host 102, applets using the same version of a JVM (e.g., JVM 138) may all run within the same JVM instance and/or plugin instance.

In one or more embodiments of the invention, each applet initialized within web browser 132 (e.g., applet 156) is executed within a container (e.g., container 150) that provides services to the applet using a message passing service implementation 144. In one or more embodiments of the invention, message passing service implementation 144 facilitates execution of the applet by enabling message passing between the applet and web browser 132. For example, message passing service implementation 144 may include functionality to query the HTTP proxy settings of web browser 132, query the HTTP cookies stored in web browser 132, load documents on web browser 132, and/or initiate calls between the applet and JavaScript (Javascript™ is a registered trademark of Sun Microsystems, Inc.) routines from web browser 132.

In one or more embodiments of the invention, message passing service implementation 144 allows applets (e.g., applet 156) to execute in JVMs (e.g., JVMs 138-142) that are separate operating system processes from the operating system process of web browser 132. The message-based nature of message passing service implementation 144 may further decouple the applets from web browser 132 by allowing the applets and web browser 132 to communicate using mechanisms other than function calls. As a result, message passing service implementation 144 may enable the applets to run independently of web browser 132.

As described above, applications on host 102 may be run using multiple execution environments. In particular, applets on host 102 may be transitioned from web browser 132 to a second execution environment (e.g., desktop environment 134, cooperating application 136, etc.) without interrupting the execution of the applets. In other words, a visual representation 168-172 of an applet 156-160 may be removed from a visual representation of web browser 132 and added to a visual representation of desktop environment 134 and/or cooperating application 136 while the applet is running. For example, visual representation 170 may be moved from web browser 132 to desktop environment 134 upon transitioning applet 158 to desktop environment 134 from web browser 132. Likewise, visual representation 172 may be moved from web browser 132 to cooperating application 136 upon transitioning applet 160 from web browser 132 to cooperating application 136. During the applet's transition to the second execution environment, communications and/or dependencies between the applet and web browser 132 may be removed during the applet's execution, thus allowing the applet to run independently of web browser 132.

Those skilled in the art will appreciate that desktop environment 134 and/or cooperating application 136 may represent a variety of execution environments. For example, desktop environment 134 may refer to a local desktop environment, a virtual desktop environment, and/or a remote desktop environment. Along the same lines, cooperating application 136 may correspond to a cooperating application in a local, virtual, and/or remote desktop environment. As a result, the framework of FIG. 1B may, for example, allow a statistics applet to be transferred from web browser 132 to an accounting application installed locally on host 102 or on a remote desktop that is accessible from host 102.

In one or more embodiments of the invention, an applet (e.g., applets 156-160) is transitioned from web browser 132 to a different execution environment (e.g., desktop environment 134, cooperating application 136) upon receiving an execution environment change notification from a user of host 102. In one or more embodiments of the invention, the execution environment change notification corresponds to a drag-and-drop action or cut-and-paste action which moves a visual representation (e.g., visual representations 168-172) of the applet from a visual representation of web browser 132 to a visual representation of the second execution environment. The drag-and-drop action may be performed using a computer mouse, trackball, touchpad, touchscreen, button, and/or other input device on host 102. Those skilled in the art will appreciate that the execution environment change notification may be carried out using other actions on host 102, such as keyboard shortcuts, menu selections, etc.

For example, during a drag-and-drop action, the applet's visual representation may be selected by clicking a mouse, pressing a button, and/or performing another input action corresponding to a selection of the applet's visual representation. The visual representation may then be placed into a new window with no title bar or borders and moved from web browser 132 to desktop environment 134 and/or cooperating application 136 using a cursor or other indicator. Finally, the visual representation may be dropped by releasing the mouse click, pressing another button, and/or performing another input action corresponding to a release of the applet's visual representation in the second execution environment.

As with typical drag-and-drop actions, the new execution environment of the applet may be based on the visual representation of the execution environment underneath the visual representation of the applet. For example, if the visual representation of the applet is released on top of a visual representation of desktop environment 134, the visual representation of the applet may stay on desktop environment 134 while the applet is moved to standalone service implementation 146 from message passing service implementation 144. However, if the visual representation of the applet is released on top of a visual representation of web browser 132 or an incompatible execution environment (e.g., an incompatible application), the applet may remain associated with message passing service implementation 144 while the visual representation of the applet returns to its original position within web browser 132.

In one or more embodiments of the invention, an execution environment change notification for a particular applet from the user is received as an event in the container executing the applet. For example, an execution environment change notification for applet 160 may be received by container 154. The execution environment change notification may be passed from plugin 162 to the container. The JVM (e.g., JVMs 138-142) and/or container running the applet may then be responsible for transitioning the applet from web browser 132 to the second execution environment.

In one or more embodiments of the invention, a change in execution environment is enabled by dynamically changing the mechanism by which an applet 156-160 receives services from the corresponding container 150-154. In other words, a change in an applet's execution environment may involve a change in the service implementation (e.g., message passing service implementation 144, standalone service implementation 146, message passing service implementation 148) provided to the applet by the corresponding container and/or JVM. Each service implementation may allow the applet to run in a particular execution environment by providing services to the applet based on the functionality, security, and/or other attributes of the execution environment.

Furthermore, the swapping of service implementations for the applet may occur during the applet's runtime because the JVM and/or container containing the applet is executed in a separate operating system process from that of web browser 132. The applet may also continue to execute in the same JVM (e.g., JVMs 138-142) instance as the swapping of service implementations is made.

To transition an applet (e.g., applet 158) from web browser 132 to desktop environment 134, the corresponding container (e.g., container 152) dynamically replaces message passing service implementation 144 with standalone service implementation 146. Similarly, a visual representation (e.g., visual representations 170) of the applet is concurrently removed from web browser 132 and displayed in desktop environment 134. After transitioning to desktop environment 134, the applet may continue to run within desktop environment 134 after web browser 132 terminates or navigates to a different webpage because standalone service implementation 146 may provide services to the applet in the context of desktop environment 134 instead of web browser 132.

In one or more embodiments of the invention, standalone service implementation 146 allows the applet to run independently of web browser 132 by ignoring messages between the applet and web browser 132. As a result, applets running in standalone service implementation 146 may no longer be affected by commands from web browser 132. In other words, web browser 132 may be unable to terminate or otherwise affect the execution of applets in standalone service implementation 146. Likewise, web browser 132 may be closed without affecting the execution of applets in standalone service implementation 146. As with message passing service implementation 144, standalone service implementation 146 exists outside of and operates independently from web browser 132. Furthermore, the execution of JVMs (e.g., JVM 140) providing standalone service implementation 146 is based not on the lifetime of web browser 132 but on the lifetimes of applets (e.g., applet 158) within the JVMs. As a result, a JVM providing standalone service implementation 146 to one or more applets may continue executing until all applets executing within the JVM are closed by the user.

Standalone service implementation 146 may also provide services to the applet in lieu of web browser 132. For example, standalone service implementation 146 may retrieve HTML documents, obtain cookie information, manage credentials, obtain proxies for network locations based on global network settings, and/or provide other web-based services to the applet. Other alternatives to services traditionally provided by web browser 132 may include displaying webpages specified by the applet in a new window of web browser 132 and/or printing messages directed to a status bar in web browser 132 to one or more console windows associated with the applet or a log file. The web-based services may further allow the applet to update its visual representation (e.g., visual representation 1 126, visual representation n 128) in desktop environment 134 and continue to perform tasks for the user outside of web browser 132.

To transition an applet (e.g., applet 160) from web browser 132 to cooperating application 136, the corresponding container (e.g., container 154) may replace message passing service implementation 144 with message passing service implementation 148. The container may also move a visual representation (e.g., visual representation 172) of the applet from web browser 132 to cooperating application 136 by, for example, transferring ownership of the window containing the visual representation to cooperating application 136. Unlike message passing service implementation 144, message passing service implementation 148 may provide services to the applet by passing messages between the applet and cooperating application 136. Consequently, the applet may no longer rely on web browser 132 for services and may continue executing within the context of cooperating application 136 after web browser 132 terminates or navigates to a different webpage.

In one or more embodiments of the invention, plugin 164 and message passing service implementation 148 allow applets (e.g., applet 160) to run within the execution environment of cooperating application 136 instead of web browser 132. In particular, plugin 164 may establish connections between the JVMs (e.g., JVM 142) running the applets and cooperating application 136, while message passing service implementation 148 may allow the applets to receive services from cooperating application 136. For example, a user may incorporate a charting application from web browser 132 into a locally installed spreadsheet application.

Furthermore, the applet's functionality may be provided to cooperating application 136 using message passing service implementation 148 and/or plugin 164. In particular, message passing service implementation 148 and/or plugin 164 may facilitate communication between the applet and cooperating application 136. Consequently, cooperating application 136 may take over services requested by the applet from web browser 132 using message passing service implementation 148. For example, cooperating application 136 may transmit data between the applet and the network in lieu of web browser 132, display web pages and messages from the applet, and/or provide network proxies to the applet. As mentioned previously, cooperating application 136 may also use plugin 164 (e.g., a Java plugin) to connect to and communicate with the JVM(s) (e.g., JVM 142) running applets associated with cooperating application 136.

Those skilled in the art will appreciate that the use of multiple message passing service implementations to communicate with different execution environments may further allow applets to execute within virtual or remote desktop environments. For example, the user may drag an applet from web browser 132 into a window containing a remote desktop. While the applet may continue to execute within a local JVM instance, the applet may communicate with the remote desktop using a network-based message passing service implementation that enables message passing between the applet and the remote desktop using a network connection with the remote desktop. The network-based message passing service implementation may transmit data such as the names of host 102, the applet, and/or the JVM hosting the applet to the remote desktop. The plugin and/or JVM associated with the applet may also hide the window containing the visual representation of the applet on host 102 and instead send the visual representation of the applet to the remote desktop using the network-based message passing service implementation. Similar message-passing capabilities may be implemented to allow applets to communicate with remotely installed cooperating applications.

Those skilled in the art will appreciate that applets may not be required to participate in execution environment changes. Furthermore, applets may be unaware of changes in their execution environments. Consequently, all applets may be transitioned from web browser 132 to a second execution environment without altering the applets' code or execution. On the other hand, newer applets may be notified of the transition by their respective plugin instances and change appearance and/or function after being placed in the second execution environment. For example, a streaming video applet may change resolution, playback options, and/or other characteristics upon removal from web browser 132 and placement in desktop environment 134 and/or cooperating application 136.

Applets may also experience changes in functionality upon transitioning to a new service implementation (e.g., standalone service implementation 146, message passing service implementation 148) from message passing service implementation 144. For example, calls between the applets and Javascript may be terminated when the applets are configured to run independently of web browser 132. For security reasons, applets may also be limited in their ability to transition to the second execution environment from web browser 132 without user input. For example, changes in applet execution environment may be prevented from occurring without initiation or confirmation by the user.

Figure 2:
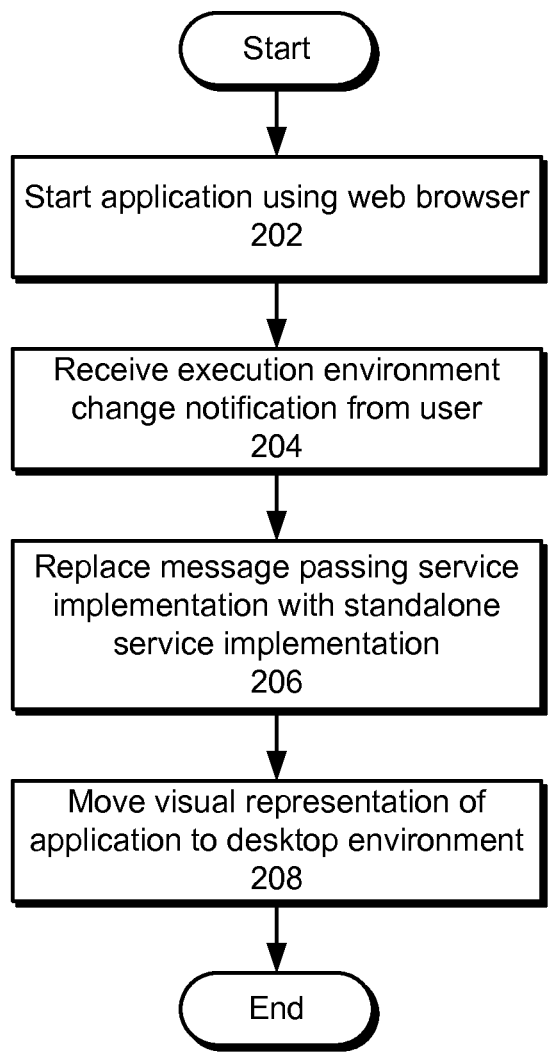
FIG. 2 shows a flowchart illustrating the process of application transition to a desktop environment from a web browser in accordance with an embodiment of the present invention.

FIG. 2 shows a flowchart illustrating the process of application transition to a desktop environment from a web browser in accordance with an embodiment of the present invention. In one or more embodiments of the invention, one or more of the steps may be omitted, repeated, and/or performed in a different order. Accordingly, the specific arrangement of steps shown in FIG. 2 should not be construed as limiting the scope of the invention.

Initially, the application is started using a web browser (operation 202). The application may be started by navigating the web browser to a webpage in which the application is embedded. Furthermore, a visual representation of the application may be displayed within the web browser as the application executes. Initialization of the application from the web browser may further involve connecting the application to a message passing service implementation (e.g., message passing service implementation 144 of FIG. 1B) that provides services to the application by passing messages between the application and the web browser.

Next, an execution environment change notification is received from the user of the web browser (operation 204). As mentioned previously, the execution environment change notification may involve a drag-and-drop action, cut-and-paste action, keyboard shortcut, and/or other input method. Upon receiving the execution environment change notification, the message passing service implementation is replaced with a standalone service implementation (operation 206) that allows the application to run independently of the web browser. The swapping of service implementations may occur during the applet's execution because the applet is executed in an operating system process that is separate from that of the web browser's. As a result, the applet may continue to run uninterrupted during the transition to the desktop environment. Once connected to the applet, the standalone service implementation may use alternative mechanisms to provide services to the applet in lieu of the web browser, such as global network settings, and/or new browser windows.

Finally, a visual representation of the application is moved to the desktop environment (operation 208) from the web browser. The visual representation may be moved by placing the visual representation into a new window with no title bar or borders and moving the new window in the desktop environment based on mechanisms associated with the execution environment change notification. For example, during a drag-and-drop action, the new window may move with the cursor until the user drops the window using the cursor. Similarly, during a cut-and-paste action, the visual representation may disappear from the web browser due to the cut action from the user and reappear in the desktop environment during the paste action from the user.

The application may be unaware of the transition and continue running unaltered, or the application may be notified of the transition and change in appearance and/or function. Furthermore, the user-provided execution environment change notification may be required to transition the application to the second execution environment to prevent the application from executing beyond the lifetime of the web browser without the user's knowledge.

Figure 3:
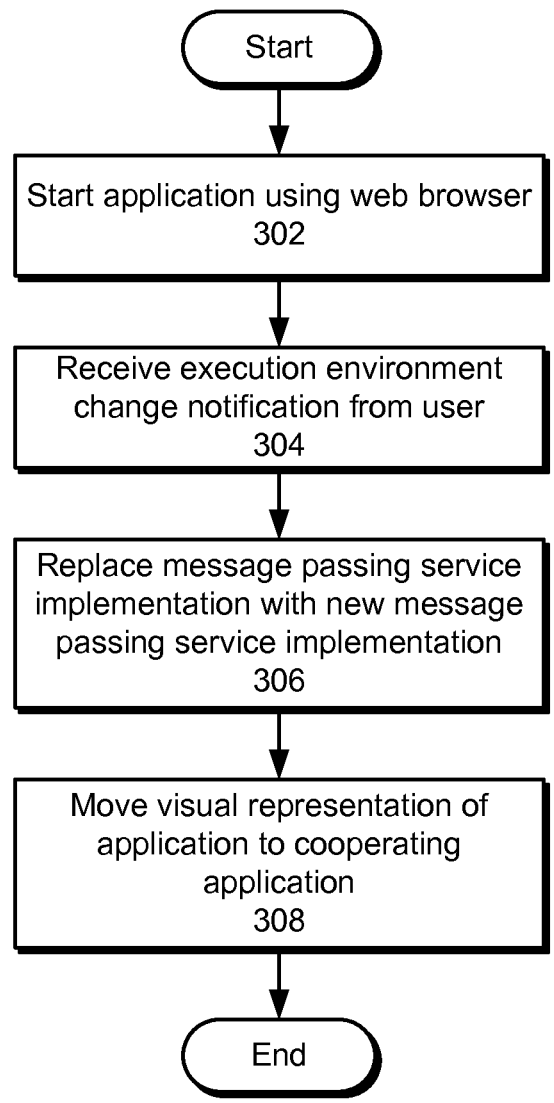
FIG. 3 shows a flowchart illustrating the process of application transition to a cooperating application from a web browser in accordance with an embodiment of the present invention.

FIG. 3 shows a flowchart illustrating the process of application transition to a cooperating application from a web browser in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

As with transitioning to a desktop environment, the application is first started using a web browser (operation 302). As discussed above, the application may be connected to a message passing service implementation that provides services to the application by passing messages between the application and the web browser. The application may continue executing within the execution environment of the web browser until an execution environment change notification is received from a user of the web browser (operation 304). The execution environment change notification may prompt a transition of the application from the web browser to the cooperating application (e.g., word processing application, spreadsheet application, etc.).

Next, the message passing service implementation between the application and the web browser may be replaced by a new message passing service implementation that allows the application to communicate with the cooperating application (operation 306). The cooperating application may thus begin providing services to the application using the new message passing service implementation. Moreover, the disconnection of the application from the web browser's services may enable the application to run after the web browser navigates to a different webpage and/or terminates.

Finally, the visual representation of the application is moved from the web browser to the cooperating application. For example, the visual representation may be dragged from the web browser to the cooperating application, cut from the web browser and pasted into the cooperating application, and/or otherwise moved based on the user's input. Moving of the application's visual representation may further involve transferring ownership of the window containing the applet's visual representation from the web browser to the cooperating application.

Figure 4:
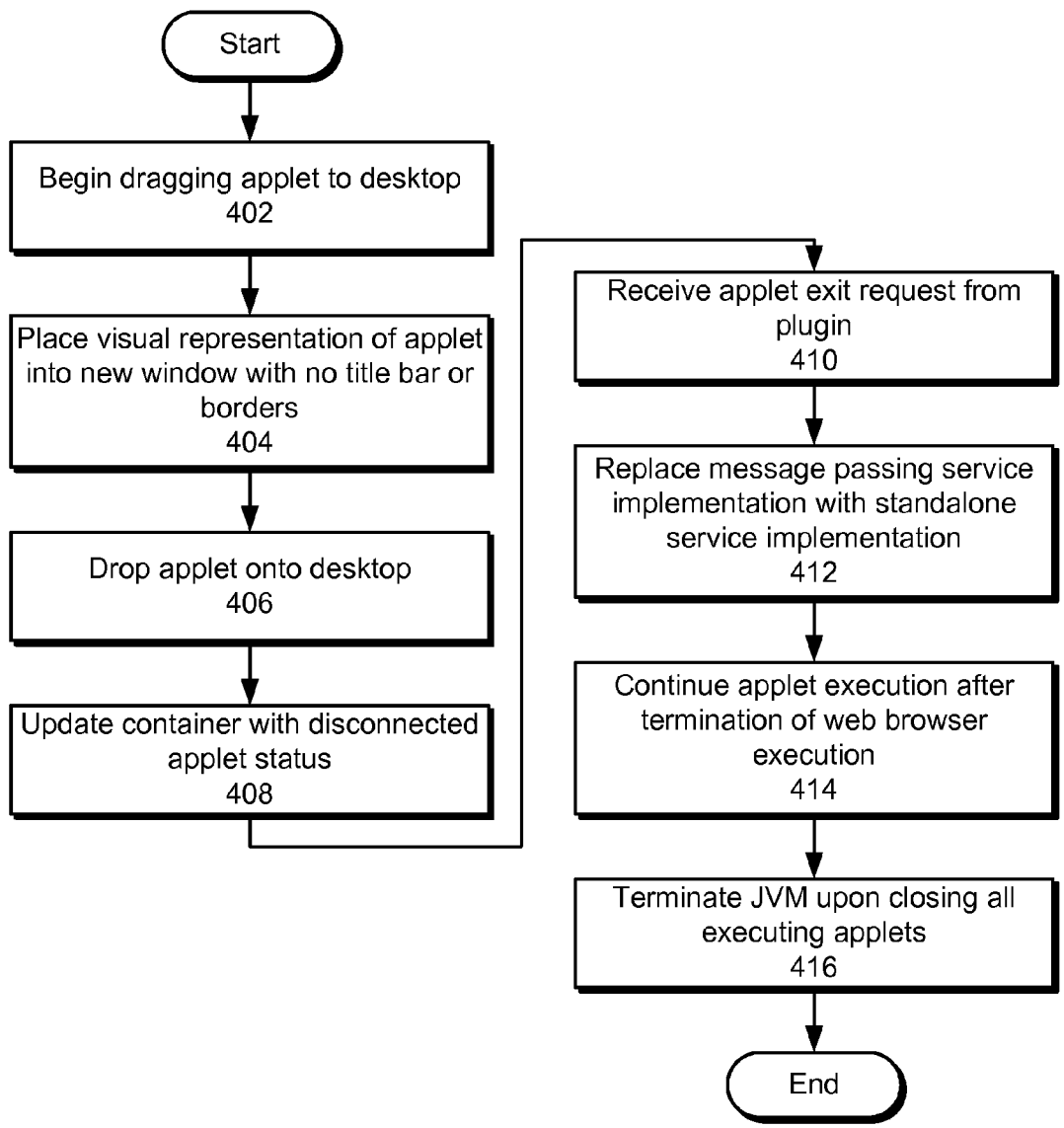
FIG. 4 shows a flowchart illustrating the process of dragging an applet from a web browser to a desktop in accordance with an embodiment of the present invention.

FIG. 4 shows a flowchart illustrating the process of dragging an applet from a web browser to a desktop in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

Initially, the user begins dragging the applet to the desktop (operation 402). The applet may correspond to a Java applet that is run within a container provided by a JVM, such as JVMs 138-142 of FIG. 1B. The drag action may be signaled by a variety of user-initiated actions, such as a mouse click, a button press, a tap on a touchpad, a keyboard shortcut, etc. Upon starting the dragging action, the visual representation of the applet is placed into a new window with no title bar or borders (operation 404). The window's location may further be updated to track the cursor as the applet is dragged to the desktop.

Next, the applet is dropped onto the desktop (operation 406). As with operation 402, operation 406 may be prompted by a user-initiated action. For example, the applet may be dropped by releasing a mouse click and/or providing a keyboard shortcut. In addition, the drag-and-drop action may generate an event that updates the container hosting the applet with a disconnected applet status (operation 408). The disconnected applet status may allow the applet to persist beyond the lifetime of the web browser.

In particular, when the web browser navigates away from the web page containing the applet and/or terminates execution, an applet exit request may be received from the plugin (operation 410) that facilitates communication between the web browser and the JVM hosting the applet. However, because the applet is now disconnected from the web browser, the applet continues to execute independently of the web browser. Instead, the message passing service implementation between the applet and the web browser is now replaced with a standalone service implementation (operation 412) that uses alternative mechanisms to provide services to the applet outside of the web browser. In other words, swapping of service implementations for the applet may occur after, rather than before or concurrent to, moving of the applet's visual representation to the desktop.

Regardless of the timing between operations 402 and 412, the applet continues executing after the termination of the web browser's execution (operation 414). Furthermore, the JVM instance is terminated only when all executing applets within have been closed (operation 416).

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
responsive to an event occurring within a web browser on a host system:
initiating an operating system process that is separate from an operating process of the web browser's;
initiating an execution of an application within the operating system process, wherein a message passing service implementation is used to provide services to the application from the web browser, and wherein the application receives a set of services by using the message passing service implementation to exchange a set of messages with the web browser;

while executing the application within the operating system process, displaying a visual representation of the application within a visual representation of the web browser;

responsive to receiving an execution environment change notification for the application, transitioning the application to a second execution environment by:

displaying the visual representation within a visual representation of the second execution environment, wherein the second execution environment operates independently of the operating system process of the web browser on the host system; and replacing the message passing service implementation with a new message passing service implementation that facilitates communication between the application and the second execution environment, wherein the replacement is performed while the application is executing; and while continuing to execute the application within the operating system process after terminating the operating system process of the web browser, continuing to display the visual representation of the application within the visual representation of the second execution environment's visual representation, wherein the new message passing service implementation allows the application to run independently of the web browser by, while the application is executing within the operating system process, ignoring another subsequent set of messages from the web browser; and wherein the method is performed by one or more computing devices.

2. The method of claim 1, wherein the second execution environment comprises one of:
a local desktop environment on the host system; and
a cooperating application on the host system.

3. The method of claim 2:
wherein the second execution environment comprises the local desktop environment on the host system;
wherein the message passing service implementation facilitates communication between the application and the web browser; and
wherein the new message passing service implementation facilitates communication between the application and the local desktop environment and ignores communication from the web browser.

4. The method of claim 1, wherein the execution environment change notification comprises one or more user-interface (UI) commands that move the visual representation of the application from the visual representation of the web browser to the visual representation of the second execution environment.

5. The method of claim 1, wherein transitioning the application to the second execution environment comprises changing a functionality of the application during the transition.

6. The method of claim 1, wherein the method further comprises preventing the transition of the application to the second execution environment until a confirmation of the change notification is received from a user.

7. The method of claim 1, wherein the operating system process comprises a virtual machine and wherein the application comprises an applet that runs within a container provided by the virtual machine.

8. The method of claim 1, wherein the event comprises one of:
a loading of a webpage; and
a receipt of an input from a user of the web browser.

9. The method of claim 1, wherein initiating the operating system process comprises invoking a plugin within the web browser and using the plugin to spawn the operating system process.

10. The method of claim 1:
wherein an operating system process is a running instance of a program that is configured to execute on an operating system; and
wherein the operating system coordinates one or more uses of hardware and software resources of a host computer between one or more operating system processes.

11. One or more non-transitory computer-readable storage media storing instructions that when executed by a computer cause the computer to perform a method, the method comprising:

responsive to an event occurring within a web browser on a host system:

initiating an operating system process that is separate from an operating system process of the web browser;

initiating an execution of an application within the operating system process, wherein a message passing service implementation is used to provide services to the application from the web browser, and wherein the application receives a set of services by using the message passing service implementation to exchange a set of messages with the web browser;

while executing the application within the operating system process, displaying a visual representation of the application within a visual representation of web browser;

responsive to receiving an execution environment change notification for the application, transitioning the application to a second execution environment by:

displaying the visual representation within a visual representation of the second execution environment's visual representation, wherein the second execution environment operates independently of the operating system process of the web browser on the computer; and replacing the message passing service implementation with a new message passing service implementation that facilitates communication between the application and the second execution environment, wherein the replacement is performed while the application is executing; and while continuing to execute the application within the operating system process after terminating of the operating system process of the web browser, continuing to display the visual representation of the application within the visual representation of the second execution environment, wherein the new message passing service implementation allows the application to run independently of the web browser by, while the application is executing within the operating system process, ignoring another subsequent set of messages from the web browser.

12. The one or more non-transitory computer-readable storage media of claim 11, wherein the second execution environment comprises one of:

a local desktop environment on the host system; and
a cooperating application on the host system.

13. The one or more non-transitory computer-readable storage media of claim 11, wherein the execution environment change notification comprises one or more UI commands that move a visual representation of the application from the visual representation of the web browser to the visual representation of the second execution environment.

14. The one or more non-transitory computer-readable storage media of claim 11, wherein transitioning the application to the second execution environment comprises changing a functionality of the application during the transition.

15. The one or more non-transitory computer-readable storage media of claim 11, wherein the method further comprises preventing the transition of the application to the second execution environment until a confirmation of the change notification is received from a user.

16. A method, the method comprising:
responsive to an event occurring within a web browser on a host system:
initiating an operating system process that is separate from an operating system process of the web browser;
initiating an execution of an application within the operating system process, wherein a message passing service implementation is used to provide services to the application from the web browser, and wherein the application receives a set of services by using the message passing service implementation to exchange a set of messages with the web browser;
while executing the application within the operating system process, displaying a visual representation of the application within a visual representation of the web browser;
responsive to receiving one or more user-interface (UI) commands that move the visual representation of the application the visual representation of the web browser to a visual representation of a second execution environment:
while continuing to execute the application within the operating system process, transitioning the application to the second execution environment by displaying the visual representation within the visual presentation of the second execution environment, wherein the second execution environment operates independently of the web browser on the host system;
replacing the message passing service implementation with a new message passing service implementation that facilitates communication between the application and the second execution environment, wherein the replacement is performed while the application is executing; and
while continuing to execute the application within the operating system process after terminating of the operating system process of the web browser, continuing to display the visual representation of the application within the visual representation of the second execution environment, wherein the new message passing service implementation allows the application to run independently of the web browser by, while the application is executing within the operating system process, ignoring another subsequent set of messages from the web browser;
while continuing to execute the application within the operating system process, responsive to a subsequent event occurring within the web browser:
initiating a subsequent operating system process that is separate from the operating system process and the operating system process of the web browser; and
initiating an execution of a subsequent application within the subsequent operating system process, wherein the visual representation of the subsequent application is displayed within the visual representation of the web browser; and
wherein the method is performed by one or more computing devices.

17. The method of claim 16, wherein the one or more UI commands comprise one of:
a drag-and-drop operation; and
a cut-and-paste operation.

18. The method of claim 16, wherein the second execution environment comprises one of:
a local desktop environment on the host system; and
a cooperating application on the host system.

19. The method of claim 16, wherein transitioning the application to the second execution environment comprises changing a functionality of the application during the transition.

20. The method of claim 16, wherein the method further comprises preventing the transition of the application to the second execution environment until a confirmation of the transition has been received from a user.

21. The method of claim 16, wherein a message passing service implementation is used to provide services to the application from the web browser, wherein transitioning the application to the second execution environment comprises replacing the message passing service implementation with a new message passing service implementation that facilitates communication between the application and the second execution environment, wherein the replacement is performed while the application is executing.

22. A method, comprising:
responsive to loading a web page in a web browser on a host system:
invoking a plugin within the web browser, wherein the plugin spawns an operating system process that is separate from an operating system process of the web browser, wherein the operating system process comprises a virtual machine; and
initiating an execution of an applet within a container provided by the virtual machine of the operating system process, wherein the container provides, to the applet, a particular message passing service implementation for passing one or more messages between the applet and the web browser, and wherein the applet receives a particular set of services by using the particular message passing service implementation to exchange a set of messages with the web browser;
while executing the applet within the container provided by the virtual machine of the operating system process, displaying a visual representation of the applet within a visual representation of the web browser;
responsive to receiving an execution environment change notification for the applet:
while continuing to execute the applet within the container provided by the virtual machine of the operating system process, transitioning the visual representation of the applet to be displayed within a visual representation of a second execution environment, which comprises replacing the message passing service implementation with a subsequent message passing service implementation for passing one or more messages between the applet and the second execution environment, wherein the subsequent message passing service implementation allows the applet to run independently of the web browser by, while the applet is executing in the second execution environment, ignoring another subsequent set of messages from the web browser; and while continuing to execute the applet within the container provided by the virtual machine of the operating system process after terminating the operating system process of the web browser, continuing to display the visual representation of the applet within a visual representation of the second execution environment; and wherein the method is performed by one or more computing devices.

23. The method of claim 22, wherein the applet receives services by exchanging messages for the services with the web browser.

24. The method of claim 22:

wherein the applet receives services by exchanging messages for the services with the web browser;

wherein the applet receives a particular set of services by using the particular message passing service implementation to exchange a set of messages with the web browser; and wherein the applet receives a subsequent set of services by using the subsequent message passing service implementation to exchange a subsequent set of messages with the second execution environment.

\* \* \* \* \*

UNITED STATES PATENT AND TRADEMARK OFFICE
CERTIFICATE OF CORRECTION

PATENT NO. : 9,531,840 B2  
APPLICATION NO. : 14/252630  
DATED : December 27, 2016  
INVENTOR(S) : Kenneth B. Russell It is certified that error appears in the above-identified patent and that said Letters Patent is hereby corrected as shown below:

In the Claims

In Column 12, Line 65, delete "browser's" and insert --browser,--

In Column 14, Line 37, after representation of please insert --the--

In Column 15, Line 20, after A method, please delete "the method"

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*